United States Patent [19]

Lütjens et al.

[11] Patent Number: 5,250,622
[45] Date of Patent: Oct. 5, 1993

[54] POLYMER COMBINATIONS WITH A HIGH RUBBER CONTENT

[75] Inventors: Holger Lütjens, Cologne; Karl-Erwin Piejko, Bergisch Gladbach; Christian Lindner, Cologne; Dieter Constant, Leverkusen, all of Fed. Rep. of Germany

[73] Assignee: Bayer Aktiengesellschaft, Leverkusen, Fed. Rep. of Germany

[21] Appl. No.: 856,379

[22] Filed: Mar. 23, 1992

[30] Foreign Application Priority Data

Apr. 5, 1991 [DE] Fed. Rep. of Germany ........ 4110974

[51] Int. Cl.⁵ .................... C08G 63/79; C08G 64/24; C08L 67/03; C08L 69/00
[52] U.S. Cl. .................... 525/148; 525/146; 525/474; 525/132
[58] Field of Search ................ 525/146, 148, 474, 132

[56] References Cited

U.S. PATENT DOCUMENTS

| | | | |
|---|---|---|---|
| 3,461,187 | 8/1969 | Cantrill | 525/148 |
| 4,336,348 | 6/1982 | Margotte | 525/146 |
| 4,386,186 | 5/1983 | Maresca et al. | 525/173 |
| 4,708,986 | 11/1987 | Gerth et al. | 525/177 |
| 4,904,733 | 2/1990 | Gerth et al. | 525/146 |
| 5,049,620 | 9/1991 | Hahn et al. | 525/177 |
| 5,137,971 | 8/1992 | Dujardin | 525/146 |

FOREIGN PATENT DOCUMENTS

| | | |
|---|---|---|
| 0014412 | 8/1980 | European Pat. Off. . |
| 0175161 | 3/1986 | European Pat. Off. . |
| 0434596 | 6/1991 | European Pat. Off. . |
| 4018717 | 12/1991 | Fed. Rep. of Germany . |
| 4020256 | 1/1992 | Fed. Rep. of Germany . |
| 1187648 | 9/1959 | France . |

Primary Examiner—David J. Buttner
Attorney, Agent, or Firm—Connolly & Hutz

[57] ABSTRACT

A process for the preparation of polymer combinations having high rubber contents from A) aromatic polyesters and B) at least partially cross-linked rubbers, in which 1) an aqueous rubber latex having a rubber solids content of up to 65% by weight is mixed with an aqueous alkali metal diphenolate solution and a water immiscible organic solvent in a quantity of from 10 to 1000 parts by weight per 100 parts by weight of rubber in the latex,
2) the mixture obtained according to 1) is reacted with dicarboxylic acid halides and/or carbonyl halides and
3) the polymer combination is recovered.

16 Claims, No Drawings

POLYMER COMBINATIONS WITH A HIGH RUBBER CONTENT

This invention relates to a process for the preparation of polymer combinations having a high rubber content.

Polymer combinations with a high rubber content composed of elastic, cross-linked rubber polymers and thermoplastic aromatic polyesters with high heat distortion temperatures are characterised inter alia by high thermostability and age resistance. They may be thermoplastic synthetic resins or rubbers.

According to earlier patent applications (German Offenlegungsschrift 4 020 256 and 4 018 717) they may be prepared by a modified phase interface polycondensation in which an aqueous alkali metal or alkaline earth metal diphenolate solution is reacted with a dicarboxylic acid halide and/or a carbonyl halide in a water immiscible organic solvent in the presence of an at least partially cross-linked rubber which is in the form of an aqueous latex. The product is worked up by separating the organic phase, which contains the polymer combination of rubber and aromatic polyester, from the aqueous phase and isolating the polymer combination from the organic phase by evaporating of the organic solvent or by coagulation in an organic precipitating medium.

This process requires a large quantity of organic solvent, i.e. a very large excess of organic solvent over the rubber in the latex (from 2000 to 8000 parts by weight of organic solvent per 100 parts by weight of rubber in the latex. This has the result that when polymer combinations having a high rubber content are prepared, the aromatic polyesters have relative low molecular weights owing to the high dilution.

A process for the preparation of polymer combinations having high rubber contents has now been found, which requires only small quantities of organic solvents and at the same time yields aromatic polyesters having higher molecular weights. In addition, isolation of the polymer combination with high rubber content is simpler because there is less solvent to be removed.

This invention relates to a process for the preparation of polymer combinations having a high rubber content from A) aromatic polyesters and B) rubbers which are at least partially cross-linked by
1) mixing an aqueous rubber latex containing up to 65% by weight, in particular up to 50% by weight, of rubber solids with an aqueous alkali metal diphenolate solution and a water immiscible organic solvent in a quantity of from 10 to 1000 parts by weight per 100 parts by weight of rubber in the latex,
2) reacting the mixture obtained according to 1) with dicarboxylic acid halides and/or carbonyl halides and
3. recovering the resulting polymer combination.

Polymer combinations with high rubber contents within the meaning of this invention contain interpolymers of aromatic polyesters and at least partially cross-linked rubbers, containing from 50 to 95% by weight, in particular from 50 to 85% by weight of rubber and optionally in addition free aromatic polyesters. The term "interpolymer" is used here to denote a combination product of aromatic polyesters and cross-linked rubber which cannot be completely separated into the pure components by physical methods. In these products aromatic polyester and rubber are linked chemically. Block copolymers and graft copolymers are typical interpolymers in this sense.

The aromatic polyesters (a term which is used according to the invention to include aromatic polyesters, aromatic polycarbonates and aromatic polyester carbonates) produced according to this invention are based on diphenols corresponding to formula (I)

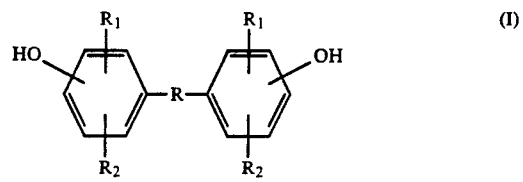

wherein $R_1$ and $R_2$=H, $C_1$–$C_4$-alkyl or halogen, preferably H, $CH_3$, Cl or Br, and
R=a single bond, $C_1$–$C_{12}$-alkylene, $C_5$–$C_{20}$-cycloalkylene or arylene, preferably

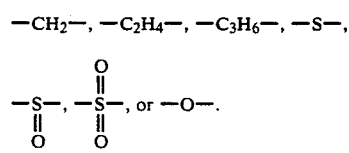

The following are examples of suitable diphenols corresponding to formula (I): hydroquinone, resorcinol, 4,4-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, 2,2-bis-(3-chloro-4-hydroxyphenyl)-propane, 2,2-bis-(3,5-dibromo-4-hydroxyphenyl)-propane and 1,1-bis-(4-hydroxyphenyl)-3,3,5-trimethylcyclohexane. The following are preferred diphenols corresponding to formula (I): 2,2-bis-(4-hydroxyphenyl)-propane, 2,2-bis-(3,5-dichloro-4-hydroxyphenyl)-propane, 1,1-bis-(4-hydroxyphenyl)-cyclohexane and 1,1-bis-(4-hydroxyphenyl)-3,3,5-trimethylcyclohexane (DE-OS 3 832 396); 2,2-bis-(4-hydroxyphenyl)-propane is particularly preferred.

Aromatic polycarbonates are prepared by reacting these diphenols with carbonyl halides such as carbonyl bromide, phosgene or mixtures thereof or with bis-chloroformates of 2,2-bis-(4-hydroxyphenyl)-propane, 2,2-bis-(4-hydroxy-3,5-dichlorophenyl)-propane or hydroquinone.

Aromatic polyesters are prepared by a reaction with dicarboxylic acid halides, for example oxalyl chloride, succinyl chloride, fumaryl chloride, glutaryl chloride, adipyl chloride, pimelyl chloride, suberyl chloride, azelayl chloride, sebacyl chloride, phthaloly chloride, isophthaloyl chloride or terephthaloyl chloride. Terephthaloyl chloride, isophthaloyl chloride and mixtures thereof are preferred and the ratio of isopthaloyl groups to terephthaloyl groups is preferably from 3:7 to 7:3, in particular from 4.5:5.5 to 5.5:4.5.

The polyester carbonates are prepared from a mixture of carbonyl halide and dicarboxylic acid halide in quantities resulting in the formation of up to 90 mol-%, preferably up to 45 mol-%, of carbonate groups, based on the sum of ester and carbonate groups.

The rubbers suitable for the process according the invention are in the form of their latices. They are generally partially cross-linked or cross-linked and have softening temperatures below 0° C. These rubbers and their latices are known. Diene rubbers are particularly suitable, in particular polymers of butadiene, isoprene and chloroprene optionally containing up to 30% by weight of a comonomer such as styrene, acrylonitrile or vinyl ethers and acrylate rubbers, in particular polymers of alkyl acrylates optionally containing up to 50% by weight of comonomers such as butadiene, alkyl methacrylate, vinyl acetate, styrene, vinyl, alkyl ethers or acrylonitrile, olefin rubbers, in particular of ethylene with comonomers such as vinyl acetate, alkyl acrylate, carbon monoxide, propylene or isobutylene, and silicone rubbers, in particular composed of structural units corresponding to the general formula $$R_n SiO_{4-n/2'}$$

wherein R denotes a monovalent hydrocarbon group, e.g. $C_1$–$C_{18}$-alkyl or $C_6$–$C_{10}$-aryl, and n has an average value of from 1 to less than 3.

The rubbers are in the form of latices, as already mentioned above. The average particle diameters in the latices are from 0.05 to 1.5 $\mu$m, in particular from 0.07 to 0.5 $\mu$m. The gel contents as a measure of crosslinking are preferably >50% by weight, most preferably >85% by weight.

The rubbers may contain reactive groups capable of reacting with the aromatic polyesters in the process of their formation. The following are examples of such groups, hereinafter referred to as X: —OH, —CH$_2$Hal (Hal=halogen e.g. chlorine or bromine),

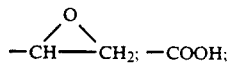

—CO—Hal (Hal = halogen, e.g. chlorine or bromine).

The quantity of structural units containing reactive groups X in the rubber amounts to 1 to 10 mol-% of all the structural units of the rubber. The reactive groups X may be introduced by, for example, the copolymerisation of monomers such as hydroxyethyl methacrylate, hydroxyethyl acrylate, p-isopropenyl phenol, 2-(hydroxyphenyl)-3-(p-isopropenylphenyl)-propane, chloromethyl styrene, glycidyl methacrylate, methacrylic acid or acrylic acid with the rubber-forming monomers or by the graft polymerisation of monomers containing the reactive groups X on the completed rubber. The reactive groups X may also be produced by polymer analogous reactions on rubbers having copolymerised structural units containing reactive groups Y; this may be carried out before or during the polycondensation. Suitable reactive groups Y (which may be at least partly converted into reactive groups X) include masked phenol groups such as phenol esters having the following structure:

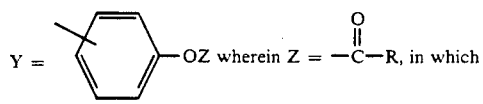

R=$C_1$–$C_4$-alkyl,
or trialkylsilane derivatives corresponding to the following structure:

wherein R=$C_1$–$C_4$-alkyl.

These masked phenol groups are at least partially split up in an alkaline or acid medium to form the phenol group. The quantity of copolymerised and/or grafted structural units containing reactive groups Y amounts to 1 mol-% to 10 mol-% of the total structural units of the rubber.

Reactive groups Y may be introduced by, for example, the copolymerisation of monomers such as p-isopropenyl phenyl acetate, p-acetoxystyrene or trimethyl-(4-isopropenylphenoxy)-silane with the monomers which build up the rubber or by the graft polymerisation of monomers containing reactive groups Y on the rubber.

Acrylate rubbers are particularly preferred; they are preferably obtained by radical emulsion polymerisation. These rubbers are cross-linked, particulate emulsion polymers of $C_1$–$C_8$-alkyl acrylates, in particular $C_2$–$C_8$-alkyl acrylates, optionally mixed with up to 30% by weight of a comonomer such as styrene, methyl methacrylate, butadiene, vinyl methylether or acrylonitrile and at least one polyfunctional cross-linking comonomer such as divinyl benzene, glycol bisacrylate, butanediol bisacrylates, bisacrylamide, phosphoric acid triallyl esters, allyl ester of acrylic acid, allyl ester of methacrylic acid, triallyl cyanurate or triallyl isocyanurate in quantities of up to 4% by weight, based on the total quantity of monomers.

The rubbers may also contain the reactive groups X and/or Y which are preferably produced by incorporation in hydroxyethyl acrylate, hydroxyethyl methacrylate or p-isopropenyl phenyl acetate.

Rubbers having a core/sheath structure as described, for example, in DE-OS 3 200 070 and DE-OS 3 704 657 may also be used.

The process according to the invention is in principle carried out as follows:

In a first stage, the aqueous latex of a cross-linked or partially cross-linked rubber, preferably an acrylate rubber, is mixed with an aqueous solution of an alkali metal salt of the diphenol corresponding to formula (I) at 0° to 50° C., preferably at 10° to 25° C. The rubber latices preferably have a solids content of from 10 to 65% by weight, in particular from 10 to 50% by weight. At this stage, it is advantageous also to use surface active compounds selected from emulsifiers or dispersing agents, for example alkyl sulphonates, alkyl benzene sulphonates, alcohol sulphonates, alkoxylated fatty alcohols, alkoxylated alkyl phenols, polyvinyl alcohol or partially hydrolysed polyvinyl acetates in quantities of from 1 to 15% by weight, based on the rubber in the latex.

The aqueous diphenolate solutions may be prepared by dissolving the diphenol corresponding to formula (I) in an aqueous alkali metal hydroxide solution, preferably sodium hydroxide solution. 2,2-bis-(4-hydroxyphenyl)-propane is a particularly preferred diphenol of formula (I). The rubber latex containing the aqueous diphenolate solution is subsequently mixed with a water immiscible, inert organic solvent, preferably methylene chloride and/or chlorobenzene, optionally containing phase transfer catalysts in solution, e.g. quaternary ammonium compounds. In a second stage, the dicarboxylic acid halide and/or carbonyl halide is added to this mixture, optionally as a solution in a water immiscible inert organic solvent, at 0° to 50° C., preferably from 10° to 25° C., within a period of from 5 minutes to 5 hours, preferably from 5 minutes to 2 hours. The total quantity of organic solvent used is from 10 to 1000 parts by weight, preferably from 10 to 500 parts by weight, per 100 parts by weight of rubber polymer in the latex.

When dicarboxylic acid halides and carbonyl halides are used side by side, it is advantageous first to add the dicarboxylic acid halide and then the carbonyl halide. Catalysts such as tertiary amines, e.g. triethylamine or N-ethyl piperidine, may be added after the carbonyl halides.

The molecular weight of the aromatic polyester—in the sense of the definition given above—is optionally regulated in known manner by the addition of a chain terminator. Suitable chain terminators are, for example, phenol and phenols containing $C_1$–$C_{22}$-alkyl groups, such as p-tert.-butyl phenol and p-isooctyl phenol.

Tertiary amines, alkali metal hydroxides and alkaline earth metal hydroxides may be used as acid acceptors, preferably sodium hydroxide.

In a third stage, the polymer combination produced is isolated from the reaction mixture. This is preferably carried out with the addition of electrolytes, for example an alkaline earth metal sulphate, and preferably at temperatures from 50° to 90° C.; the polymer combination is then separated by filtration and washed with water. Isolation of the polymer combination is optionally preceded by removal of the organic solvent from the reaction mixture, for example by distillation, application of a vacuum or the passage of a stream of nitrogen through the reaction mixture. It is particularly advantageous to isolate the polymer combination by introducing the reaction mixture at temperatures of from 50° to 90° C. into an aqueous solution of electrolyte, preferably an alkaline earth metal sulphate and mineral acids, e.g. phosphoric acid, or organic acids, e.g. acetic acid, with thorough mixing and then to separate and wash the polymer combination. The quantity of mineral or organic acid should be at least sufficient to neutralize the basic reaction mixture, i.e. the pH of the aqueous filtrate obtained after separation of the polymer combination should be from 3 to 7.

The polymer combinations with high rubber contents prepared according to the invention may be mixed with aromatic polyesters (this term includes aromatic polyesters, aromatic polycarbonates and aromatic polyester carbonates) which may be used in powder form or as granulates. These mixtures contain from 1 to 99% by weight, preferably from 5 to 80% by weight, most preferably from 7 to 40% by weight of the polymer combinations with high rubber contents and from 99 to 1% by weight, preferably from 95 to 20% by weight, most preferably from 93 to 60% by weight of the aromatic polyesters. Mixing of the high rubber polymer combinations with the aromatic polyesters may be carried out in conventional mixing apparatus such as rollers, kneaders or single shaft or multishaft extruders. The mixtures are suitable for the production of molded articles of all types by methods of thermoplastic molding such as extrusion and injection molding and they have improved elasticity and elongation at break and good surface properties such as gloss, homogeneity and uniformity and are particularly light in colour. The high rubber polymer combinations may also be used for the production of elastic moldings which are distinguished by good thermostability and age resistance and advantageous mechanical properties such as tensile strength.

Examples

1. Preparation of the rubber latices 1.1 28 parts by weight of a polybutadiene latex having a solids content of 41.8% by weight (average particle diameter ($d_{50}$): 100 nm, gel content determined in toluene: 91% by weight) and 820 parts by weight of water are introduced into a reactor under nitrogen and heated to 80° C. A mixture of 61.2 parts by weight of n-butyl acrylate, 3.3 parts by weight of p-isopropenyl phenyl acetate (3.75 mol %) and 0.5 parts by weight of triallyl cyanurate are added thereto. A solution of 2.3 parts by weight of potassium peroxydisulphate and 50 parts by weight of water is then added at 80° C. and the reaction mixture is stirred for one hour. The following are then added at a uniform rate at 75° C. over a period of four hours:

mix 1: 1558 parts by weight of n-butyl acrylate 83 parts by weight of p-isopropenyl phenyl acetate (3.75 mol-%) 13.5 parts by weight of triallyl cyanurate mix 2: 18 parts by weight of the sodium salt of $C_{14}$–$C_{18}$-alkyl sulphonic acids 1950 parts by weight of water.

The reaction mixture is then stirred for four hours at 75° C. The latex obtained has a solids content of 37.7% by weight.

The gel content of the polymer is 92.5% by weight (determined in tetrahydrofuran). The obtained latex is diluted to a solids content of 20% by weight and used in the following Examples.

1.2 A rubber latex is prepared as in Example 1.1 from: 6.2 parts by weight of n-butyl acrylate, 3.3 parts by weight of 2-hydroxyethyl methacrylate (5 mol %) and 0.5 parts by weight of triallyl cyanurate.

mix 1: 1558 parts by weight of n-butyl acrylate 83 parts by weight of 2-hydroxyethyl methacrylate (5 mol%) 13.5 parts by weight of triallyl cyanurate mix 2: 18 parts by weight of the sodium salt of $C_{14}$–$C_{18}$-alkyl sulphonic acids 1950 parts by weight of water.

The latex obtained has a solids content of 37.7% by weight. The gel content of the polymer is 93.0% by weight (determined in tetrahydrofuran). The latex is diluted with water to a solids content of 20% by weight and used in Example 2.2.

1.3 A rubber latex is prepared as in Example 1.1 from: 64.5 parts by weight of n-butyl acrylate and 0.5 parts by weight of triallyl cyanurate.

mix 1: 1641 parts by weight of n-butyl acrylate 13.5 parts by weight of triallyl cyanurate mix 2: 18 parts by weight of the sodium salt of $C_{14}$–$C_{18}$-alkyl sulphonic acids 1950 parts by weight of water.

The latex obtained has a solids content of 37.7% by weight. The gel content is 92.0% by weight (determined in tetrahydrofuran). The latex is diluted to a solids content of 20% by weight with water and used in Example 2.4.

2. Preparation of the polymer combinations 2.1 420 g of a rubber latex according to Example 1.1 having a solids content of 20% by weight are mixed with a solution of 22.83 g (0.10 mol) of 2,2-bis-(4-hydroxyphenyl)-propane (hereinafter referred to as bisphenol A), 8.5 g of sodium hydroxide and 4.0 g of the sodium salt of $C_{14}$–$C_{18}$-alkyl sulphonic acids in 425 g of water.

0.65 g of tetrabutyl ammonium bromide in 40 g of methylene chloride are then added. A solution of 10.36 g (0.051 mol) of terephthaloyl chloride and 10.36 g (0.051 mol) of isophthaloyl chloride in 50 g of methylene chloride is then added within 15 minutes with constant stirring and stirring is continued for a further 30 minutes.

The reaction mixture is worked up by introducing it with mixing into a receiver heated to 80° C. to 90° C. containing 10 g of magnesium sulphate and 10 g of concentrated acetic acid and 2000 g of water.

The precipitated polymer combination is filtered off, washed free from electrolytes and dried.

Quantity of polymer: 118 g gel content (determined in tetrahydrofuran): 72.0% by weight ($\eta$)-sol phase: 0.51 dl/g ($\eta$)=intrinsic viscosity, determined in tetrahydrofuran at 25° C.

2.2 The procedure is the same as in Example 2.1 but using 420 g of the rubber latex according to Example 1.2 having a solids content of 20% by weight.

Quantity of polymer: 116 g gel content (determined in tetrahydrofuran): 74.0% by weight ($\eta$) sol phase: 0.50 dl/g.

2.3 The procedure is the same as in Example 2.1 but using 270 g of the rubber latex according to Example 1.1 having a solids content of 20% by weight.

Quantity of polymer: 88.5 g gel content (determined in tetrahydrofuran): 63.5% by weight ($\eta$) sol phase: 0.48 dl/g.

2.4 180 g of a rubber latex according to Example 1.3 having a solids content of 20% by weight are mixed with a solution of:

22.83 g (0.10 mol) of bisphenol A, 8.5 g of sodium hydroxide and 4.0 g of the sodium salt of $C_{14}$–$C_{18}$-alkyl sulphonic acids in 425 g of water.

0.65 g of Tetrabutyl ammonium bromide in 20 g of methylene chloride are then added. A solution of 10.36 g (0.051 mol) of terephthaloyl chloride and 10.36 g (0.051 mol) of isophthaloyl chloride in 50 g of methylene chloride is then added within 15 minutes with constant mixing and the reaction mixture is stirred for a further 30 minutes.

The product is worked up as in Example 2.1.

Quantity of polymer: 69.6 g gel content (determined in tetrahydrofuran): 47.0% by weight ($\eta$) sol phase: 0.52 dl/g 2.5 380 g of a rubber latex according to Example 1.1 having a solids content of 20% by weight are mixed with a solution of:

22.83 g (0.10 mol) of bisphenol A, 24 g (0.60 mol) of sodium hydroxide and 5.0 g of the sodium salt of $C_{14}$–$C_{18}$-alkyl sulphonic acids in 425 g of water.

0.97 g of tetrabutyl ammonium bromide in 95 g of methylene chloride are then added.

19.8 g (0.20 mol) of phosgene are then introduced with constant mixing at 20° to 25° C. within 5 minutes and the reaction mixture is stirred for a further 45 minutes.

The product is worked up by introducing the reaction mixture with thorough mixing into a receiver heated to 80° to 90° C. containing:

18 g of magnesium sulphate and 18 g of concentrated acetic acid and 2000 g of water.

The precipitated polymer combination is filtered off, washed free from electrolytes and dried.

Quantity of polymer: 99.5 g gel content (determined in tetrahydrofuran): 84.0% by weight ($\eta$) sol phase: 0.37 dl/g 2.6 295 g of a rubber latex according to Example 1.1 having a solids content of 20% by weight are mixed with a solution of:

22.83 g (0.10 mol) of bisphenol A, 24 g (0.60 ml) of sodium hydroxide and 5.0 g of the sodium salt of $C_{14}$–$C_{18}$-alkyl sulphonic acids in 425 g of deionised water.

This procedure is followed by the addition of 65 g of methylene chloride. 19.8 g (0.20 mol) of phosgene are then introduced at 20° to 25° C. within 5 minutes with constant mixing, 0.14 ml of N-ethyl-piperidine are added and the mixture is stirred for a further 45 minutes. The product is worked up as in Example 2.5. Quantity of polymer: 83.0 g.

Gel content (determined in tetrahydrofuran): 82.2% by weight.

($\eta$) sol phase: 0.45 dl/g

The gel contents were determined by the method of M. Hoffman et al, Polymeranalytik I and II, Georg Thieme Verlag, Stuttgart (1977)).

The polymer combinations of Examples 2.1 to 2.6 prepared by the process according to the invention are pulverulent products. Elastic moldings distinguished by high age resistance, high thermostability and lightness of colour can be produced from them.

2.7 1320 g of a rubber latex according to Example 1.1 having a solids content of 20% by weight are mixed with a solution of:

43.4 g (0.14 mol) of 1,1-bis(4-hydroxyphenyl)-3,3,5-trimethylcyclohexane 59.4 g (0.26 mol) of bisphenol A 96 g (2.40 mol) of sodium hydroxide and 20 g of the sodium salt of $C_{14}$–$C_{18}$-alkyl sulphonic acids in 1700 g of E-water Then 260 g of methylene chloride are added, after which 80 g (0.80 mol) of phosgene are introduced at 20°–25° C. with continuous mixing, the pH value optionally being kept at pH=13 by adding sodium hydroxide solution (20% by weight). Then 0.56 ml of N-ethylpiperidine is added and the mixture is subsequently stirred for 45 minutes.

The reaction mixture is worked up by introducing it with thorough mixing into a receiver heated to 80°–90° C. and containing:

72 g of magnesium sulphate and 120 g of concentrated acetic acid and 8000 of water.

The precipitated polymer combination is filtered off, washed free of electrolytes and dried.

Quantity of polymer: 359.5 g

Gel content (measured in tetrahydrofuran): 83.7% by weight

[$\eta$]-sol phase: 0.44 dl/g 2.8 The same procedure is employed as in Example 2.7, but the following quantities of the starting products are used:

1396 g of the rubber latex according to Example 1.1 having a solids content of 20% by weight, Solution of 68.2 g (0.22 mol) of 1,1-bis(4-hydroxyphenyl)-3,3,5-trimethylcyclohexane 41.1 g (0.18 mol) of bisphenol A 96 g (2.40 mol) of sodium hydroxide 20 g of the sodium salt of $C_{14}$-$C_{18}$-alkyl sulphonic acids in 1760 g of E water 260 g of methylene chloride 80 g (0.80 mol) of phosgene, and 0.56 ml of N-ethylpiperidine.

The reaction mixture is worked up by introducing it with thorough mixing into a receiver heated to 80°-90° C. and containing 80 g of magnesium sulphate 170 g of concentrated acetic acid and 8000 g of water. The precipitated polymer combination is filtered off, washed free of electrolytes and dried.

Quantity of polymer: 378 g

Gel content (measured in tetrahydrofuran): 79.2% by weight $[\eta]$-sol phase: 0.32 dl/g.

We claim:

1. A process for the preparation of polymer combinations having a high rubber content from A) aromatic polyesters and B) at least partially cross-linked rubbers, wherein 1) an aqueous rubber latex having a rubber solids content of up to 65% by weight is mixed with an aqueous alkali metal diphenolate solution and a water immiscible organic solvent in a quantity of from 10 to 100 parts by weight per 100 parts by weight of rubber in the latex, 2) the mixture obtained according to 1) is reacted with dicarboxylic acid halides, carbonyl halides or mixtures thereof and 3) the polymer combination formed is recovered.

2. A process according to claim 1, wherein recovery is effected by the addition of electrolytes and separation of the polymer combination by filtration and washing with aqueous liquids.

3. A process according to claim 1, wherein additional surface active compounds are used in 1).

4. A process according to claim 1, wherein the rubbers in the latex have gel contents greater than 50% by weight and average particle diameters ($d_{50}$) of from 0.05 to 1.5 μm.

5. A process according to claim 1, wherein the rubbers are diene rubbers, acrylate rubbers, silicone rubbers, olefin rubbers or mixtures thereof in latex form, optionally containing reactive groups.

6. A process according to claim 3, wherein the additional surface active compounds are emulsifiers.

7. A process according to claim 3, wherein the additional surface active compounds are dispersing agents.

8. A process according to claim 3, wherein the surface active compound is selected from the group consisting of alkyl sulphonates, alkyl benzene sulphonates, alcohol sulphonates, alkoxylated fatty alcohols, alkoxylated alkyl phenols, polyvinyl alcohol, and partially hydrolysed polyvinyl acetates.

9. A process according to claim 1, wherein the aromatic polyester is an aromatic polycarbonate or aromatic polyester carbonate.

10. A process according to claim 1, wherein the diphenol solution is based on 2,2-bis-(4-hydroxyphenyl)-propane, 2,2-bis(3,5-dichloro-4-hydroxyphenyl)-propane, 1,1-bis-(4-hydroxyphenyl)-cyclohexane, or 1,1-bis-(4-hydroxyphenyl)-3,3,5-trimethylcyclohexane.

11. A process according to claim 1, wherein the diphenol is 2,2-bis-(4-hydroxyphenyl)-propane.

12. A process according to claim 1, wherein the dicarboxylic acid halides are terephthaloyl chloride or isophthaloyl chloride.

13. A process according to claim 1, wherein the dicarboxylic acid halides are a mixture of terephthaloyl chloride and isophthaloyl chloride.

14. A process according to claim 13, wherein the ratio of isophthaloyl groups to terephthaloyl groups is from 3:7 to 7:3.

15. A process according to claim 13, wherein the ratio of isophthaloyl groups to terephthaloyl groups is from 4.5:5.5 to 5.5:4.5.

16. A process according to claim 1, wherein the rubber is in the form of a lattice.

* * * * *